United States Patent [19]

Frosch et al.

[11] 4,119,926

[45] Oct. 10, 1978

[54] APPARATUS AND METHOD FOR STABILIZED PHASE DETECTION FOR BINARY SIGNAL TRACKING LOOPS

[76] Inventors: Robert A. Frosch, Administrator of the National Aeronautics and Space Administration with respect to an invention of; Phillip M. Hopkins, Houston, Tex.

[21] Appl. No.: 858,765

[22] Filed: Dec. 8, 1977

[51] Int. Cl.² .................................................. H03B 3/04
[52] U.S. Cl. ..................................... 331/1 A; 307/232;
328/133; 331/14; 331/23; 331/27
[58] Field of Search ................ 331/1 A, 18, 23, 25,
331/27, 14; 329/50, 122, 124, 112; 325/346,
349, 423; 307/232; 328/133, 134, 155

[56] References Cited
U.S. PATENT DOCUMENTS

| | | | |
|---|---|---|---|
| 3,588,720 | 6/1971 | Fluhr | 329/50 X |
| 3,768,030 | 10/1973 | Brown et al. | 331/25 X |
| 3,873,923 | 3/1975 | Iten et al. | 325/423 |

*Primary Examiner*—Siegfried H. Grimm

*Attorney, Agent, or Firm*—Marvin J. Marnock; John R. Manning; Marvin F. Matthews

[57] ABSTRACT

A new and improved apparatus and method for phase detection in binary signal tracking loops wherein two bandpass detectors are alternately interchanged between electrical connection with two local code reference tracking signals in order to cancel any adverse effect of gain imbalance in the bandpass detectors and direct current offset or drift. The incoming signal is multiplied with the two local reference signals in a mixer circuit to form first and second product signals which are each separately provided to two bandpass detectors to form error signals. A dither generator controls a first switching circuit to alternately interconnect the two local reference signals to the mixer circuit during the step of multiplying and also controls a second switching circuit to alternately interconnect the error signals to a summing circuit to form a composite error signal representing a difference in levels of the two error signals from the detectors. The detectors are thus time shared in multiplex fashion between the two local reference signals.

17 Claims, 8 Drawing Figures

APPARATUS AND METHOD FOR STABILIZED PHASE DETECTION FOR BINARY SIGNAL TRACKING LOOPS

ORIGIN OF THE INVENTION

The invention described herein was made in the performance of work under a NASA contract and is subject to the provisions of Section 305 of the National Aeronautics and Space Act of 1958. Public Law 85-568 (72 Stat. 435; 45 U.S.C. 2457).

BACKGROUND OF THE INVENTION

1. Field of Invention

The present invention relates to phase detection for binary signal tracking loops.

2. Description of the Prior Art

In phase detection for binary signal tracking loops, two bandpass detectors were used, one of which receives an incoming signal modulated by a local digital reference signal, known as an early code, with pulses occurring slightly earlier in time than the desired tracking signal, and the other of which receives an incoming signal modulated by a local digital reference signal, termed a late code, with pulses occurring slightly later in time than the desired tracking signal. The two bandpass detectors derived error signals which were summed to control a voltage-controlled oscillator (VCO) to ensure synchronism. However, equal gain levels in both bandpass detectors was difficult to achieve and maintain, with gain imbalance introducing improper changes in the level of the error signal. Further, direct current offset or drift in either detector compounded the problem.

In an effort to reduce the effect of gain imbalance between bandpass detectors, another type of detector, known as a "tau-dither" loop, time-shared a single bandpass detector between two channels to reduce the effects of gain drift and offset drift. However, time-sharing of a single bandpass detector reduced the effective processing time for each channel by fifty percent, causing a degradation of tracking performance, particularly where the incoming signal had a low signal-to-noise ratio.

SUMMARY OF THE INVENTION

Briefly, the present invention provides a new and improved apparatus and method for stabilized phase detection in binary signal tracking loops to track an incoming signal in the presence of gain level changes and imbalance by using two local reference signals.

The incoming signal is multiplied with the two local reference signals in a mixer circuit to form first and second product signals which are each separately provided to two bandpass detectors which form error signals from the first and second product signals, respectively. The error signals from the two bandpass detectors are then formed into a composite error signal.

With the present invention, the two local reference signals are alternately interconnected to the mixer, while the error signals from the bandpass detector are alternately interconnected to the circuit which forms the composite error signal. In this manner, the two bandpass detectors are time-shared in time division multiplex fashion between the two local reference signals so that each bandpass detector is continuously receiving a product of the incoming signal and one of the two local reference signals and consequently forming an error signal. In this manner, the effects of gain imbalance between bandpass detectors and any direct current offset or drift on the formation of the tracking signal are compensated for without causing any degradation in tracking performance.

DESCRIPTION OF THE PREFERRED EMBODIMENT

At the outset, a brief discussion of phase lock loops and prior art phase detectors is submitted to assist in understanding the present invention. In a phase lock loop L, a phase detector P receives an input signal and a signal from a waveform generator G and forms therefrom an error voltage. The error voltage so formed is furnished through a loop filter F to a voltage controlled oscillator O, commonly termed a VCO, whose frequency is controlled by the error signal. The VCO generates an output signal which is provided to waveform generator G. In this manner, the incoming signal is tracked in the phase detector P.

Figure 2:
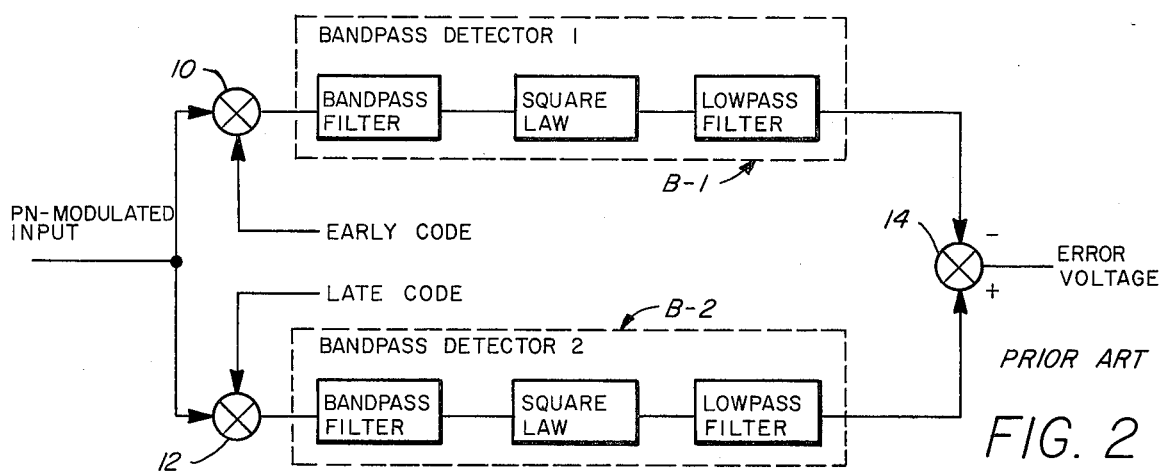
FIGS. 2 and 3 are schematic electrical circuit diagrams of prior art phase detectors used in the tracking loop of FIG. 1.

A first type (FIG. 2) of prior art phase detector loop is known as a delay lock loop or DLL and is disclosed, for example, in an article by J. J. Spilker, Jr., "Delay-Lock Tracking of Binary Signals", *IEEE Transactions on Space Electronics and Telemetry*, Vol. SET-9, March 1963, pp. 1–8.

Figure 1:
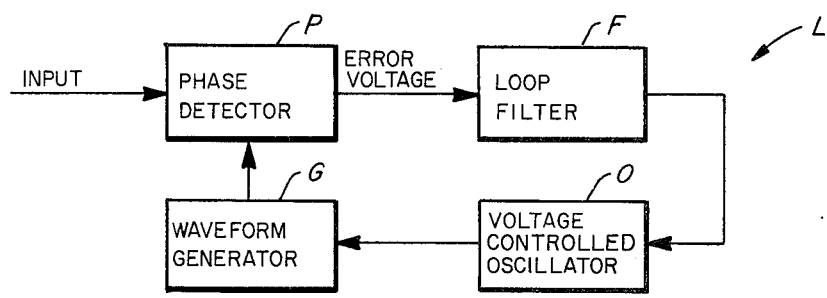
FIG. 1 is a schematic electrical circuit diagram of a binary signal tracking loop.

In the delay lock loop (FIG. 2), the incoming input pseudo-noise (PN) code modulated signal is provided to mixer circuits 10 and 12 and multiplied by a code known as an "early code", a timing signal whose pulses occur in time slightly in advance of the timing pulses of the signal being tracked and a tracking code signal known as a "late code" signal whose timing pulses occur slightly later in time than the time of occurrence of the pulses of the signal being tracked. The early code and late code are formed in conventional digital code generating circuitry. The output of the mixer 10 is provided to a first bandpass detector B-1 having a bandpass filter, square law circuit and low pass filter so that an error signal representing the phase error between the incoming input signal and the "early" code is formed and provided to a summing circuit 14 at an input thereof. In a like manner, the product signal formed in the mixer 12 is provided to a second bandpass detector B-2 having a bandpass filter, square law circuit and low pass filter for forming an error signal which is also provided to the summing circuit 14. The summing circuit 14 sums the two error signals formed in the bandpass detectors B-1 and B-2 and provides as an output result an error voltage which is provided through the loop filter F (FIG. 1) for provision to the voltage controlled oscillator O.

Figure 3:
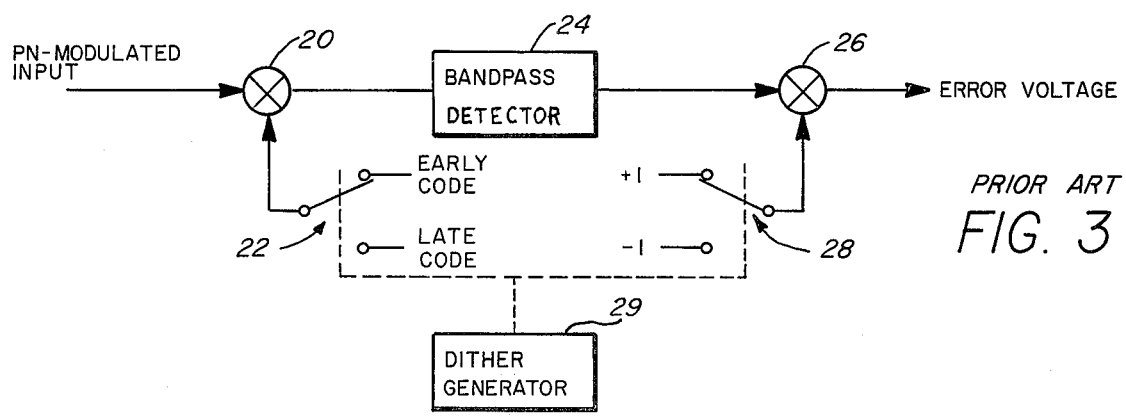

Another type of prior art phase detector (FIG. 3) is known as a tau-dither loop or TDL and is disclosed in articles by Walter J. Gill, "A Comparison of Binary Delay-Lock Tracking-Loop Implementations", *IEEE Transactions on Aerospace and Electronic Systems*, Vol. AES-2, July 1966, pp. 415–424; and by H. P. Hartmann, "Analysis of a Dithering Loop for PN Code Tracking", *IEEE Transactions on Aerospace and Electronic Systems*, Vol. AES-10, January 1974, pp. 2–9.

In the TDL circuit (FIG. 3) the incoming signal is provided to a mixer 20 which alternately receives through a switch 22 the early code and the late code during alternating intervals. The mixer 20 forms a product signal from the signals furnished thereto which is provided through a bandpass detector 24, of the type set forth above, to a summing circuit 26 which receives from a switch 28, operating in synchronism with the switch 22, appropriate bias levels to indicate the presence of the early code or late code to the multiplier 20. A dither generator 29, which is a local clock signal generator circuit, causes the switches 22 and 28 to operate in time synchronism with each other. The operating frequency of the dither generator 29 is lower than the bandwidth of the bandpass filter in the detector 24 and higher than the bandwidth of the tracking loop.

However, with either of the two prior art phase detectors discussed above, problems were present. In implementing the DLL of FIG. 2, difficulties occur in maintaining a close match between the two bandpass detectors B-1 and B-2 over a wide range of signal-to-noise ratio. Any imbalance in gain, and any direct current offset or drift between the two detectors causes error in tracking. The TDL (FIG. 3) overcomes the problem of imbalance between two bandpass detectors, however, at the cost of a reduction in tracking performance in the presence of noise. In the article referenced above, it is stated that approximately 3 decibels (dB) in noise performance is lost, an undesirable feature when low signal-to-noise ratios are present in digital data communication, such as with orbiting or interplanetary spacecraft.

With the present invention, a detector D (FIG. 4) receives the pseudo noise (PN) code modulated input signal at a first mixer multiplier 30 and a second mixer multiplier 32. The mixer multipliers 30 and 32 are alternately electrically connected, in a manner to be set forth below, through a first switching circuit 34 to an early code signal, $C(t + \Delta/2 + \tau)$, whose bit interval occurs a short time interval, $\Delta/2$, prior to the desired bit interval of the tracking signal to be formed, and to a late code, $C(t - \Delta/2 + \tau)$, whose bit interval occurs a similar short $\Delta/2$ interval after the desired occurrence of the data bit interval of the reference signal to be formed. The time duration of the two combined time intervals, $\Delta$, is preferably equal to the bit rate of the incoming signal.

Figure 5:
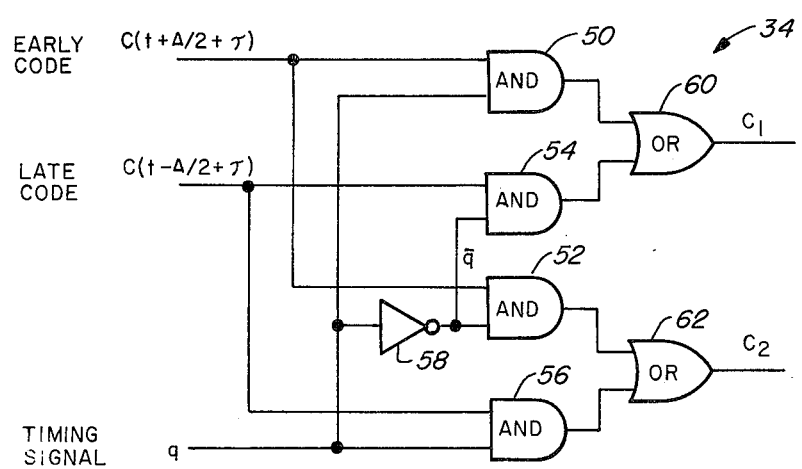
FIGS. 5 and 6 are schematic electrical circuit diagrams of portions of the phase detector of FIG. 4.

The first switching circuit 34 (FIGS. 4 and 5) alternately interconnects each of the mixer multipliers 30 and 32 during alternate half-cycles of the early code and late code signal to one or the other of such code signals so that a first product signal, $x_1 + n_1$, with $n_1$ being noise, representing a time multiplexed product of the early code and late code is provided to a first bandpass detector 36. Similarly, the second mixer multiplier 32 forms a second product signal, $x_2 + n_2$, with $n_2$ being noise, representing the product of the input signal and the early code and late code, in reverse order from the first product signal, and again in time division multiplexed format to a second bandpass detector 38.

The bandpass detectors 36 and 38 form, from the product signals presented thereto, error signals representing the error between the incoming signal and the desired local reference signal which are provided through a second switching circuit 40 (FIGS. 4 and 6), controlled by a signal $q$ from a dither generator 42, to a summing circuit 44 which forms a composite error signal representing the difference in levels of the error signals from the bandpass detectors 36 and 38. As with the first switching circuit 34, the switching circuit 40 alternately interconnects the error signal from the bandpass detector 36 to both a positive input terminal 44a of the summing circuit 44 and a negative input terminal 44b of the summing circuit, while providing the error signal from bandpass detector 38 to such input terminals of summing circuit 44 in reverse order to the error signal from the bandpass detector 36. Switching of the switching circuit 40 is performed, in a like manner, to the first switching circuit 34 under control of the dither generator 42.

Considering now the first switching circuit 34, the early code, $C(t+\Delta/2+\tau)$, is provided as an input signal to AND gates 50 and 52, while the late code, $C(t-\Delta/2+\tau)$, is provided to AND gates 54 and 56. AND gates 50 and 56 receive the timing signal $q$ from the dither generator 42 while an inverter 58 inverts such timing signal and provides the inverted timing signal $\bar{q}$ to AND gates 52 and 54. The timing signal $q$ is logic "1" during one half-cycle of each clock period of the dither generator 42.

An OR gate 60 is connected to the output of AND gates 50 and 54, while an OR gate 62 is connected to the outputs of AND gates 52 and 56.

With the switching circuit 34 configured in the manner set forth above, during intervals when the timing signal $q$ is Logic "1" level, AND gate 50 is enabled to pass the early code signal C through the OR gate 60 to the first mixer multiplier 30, while AND gate 56 is enabled to pass the late code signal through OR gate 62 to the second mixer multiplier 32. Conversely, during half-cycles of the timing signal $q$ when the level of such signal is logic "0", the inverted output of inverter 58, $\bar{q}$, enables the late code to pass from AND gate 54 through OR gate 60 to the first mixer multiplier 30 and similarly enables AND gate 52 to pass the early code through the OR gate 62 to the second mixer multiplier 32.

In this manner, switching circuit 34 forms a composite code signal $C_1$, which is a time-division multiplexed composite of alternating half-cycles of the early code and the late code as output signal through OR gate 60. Further, a second composite code signal $C_2$, also a time-division multiplexed composite of alternating half-cycles of the early code and the late code, but in opposite order from the code signal $C_1$, is formed in switching circuit 34 and provided as an output signal from OR gate 62.

The mixer multipliers 30 and 32 receive the code signals $C_1$ and $C_2$, respectively, and form from these code signals and the incoming PN modulated input, $AC(t)\cos(wt)+n(t)$, with $n(t)$ representing noise, product signals $(x_1 + n_1)$, and $(x_2 + n_2)$ with $n_1$ and $n_2$ representing noise, respectively. The product signal $x_1 + n_1$ is provided to bandpass detector 36, while product signal $x_2 + n_2$ is provided to bandpass detector 38. Bandpass detector 36 forms an error signal $Z_1$, while bandpass detector 38 forms an error signal $Z_2$. The error signals $Z_1$ and $Z_2$ contain therein time division-multiplexed, filtered alternating half cycles of the product by multiplying the early code and the late code, respectively, with the incoming signal.

The switching circuit 40 demultiplexes the error signals $Z_1$ and $Z_2$ and forms therefrom a continuous "early" error signal at the positive input 44a of the summing circuit 44 and a continuous "late" error signal at the negative input 44b of the summing circuit 44.

Figure 6:
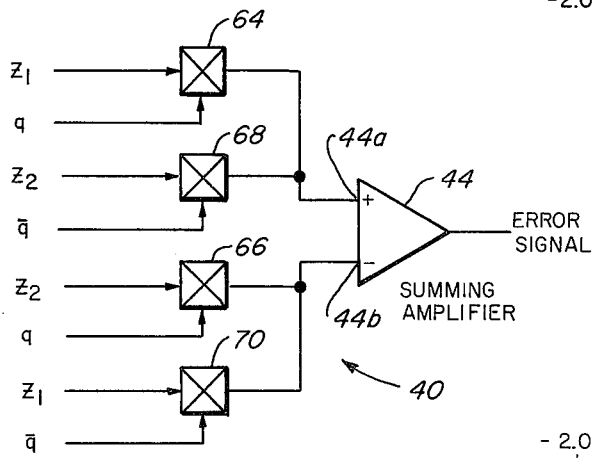

Considering now the second switching circuit 40, analog gates 64 and 66 thereof are enabled during the half cycle of time intervals when the timing signal $q$ is logic "1", as indicated schematically in FIG. 6, to pass the error signal $Z_1$ from bandpass detector 36 to the positive input terminal 44a of the summing amplifier 44. Similarly, the analog gate 66 is simultaneously enabled to pass the error signal $Z_2$ from the bandpass detector 38 to the negative input terminal 44b of the summing circuit 44. During alternate half-cycles when the output $q$ of the dither generator $q$ is logic "0", the inverted output $\bar{q}$ from the inverter 58 enables the error signal $Z_2$ from the bandpass detector 38 to pass to the positive input terminal 44a, while an analog gate 70 is energized to permit the error signal $Z_1$ from the bandpass detector 36 to pass to the negative input terminal 44b of the summing amplifier 44.

In this manner, it has been found with the present invention that the direct current offset feature of the tau-dither loop can be obtained without degrading tracking performance, even at low signal-to-noise ratios.

ANALYSIS OF OPERATION AND ADVANTAGES

In the detector D, the switching circuit 34 alternately interconnects the bandpass detectors 36 and 38 to the product signals formed between the incoming signal and the early and late codes.

As set forth above, the "early" correlation signal $X_1$ plus noise $n_1$, is formed in alternating half-cycles by mixer multipliers 30 and 32 as the early code is furnished thereto from the switching circuit 34. Similarly, a "late" correlation signal $X_2$, plus noise $n_2$, is formed in alternating half-cycles in reverse order from the "early" signal by mixer multipliers 30 and 32 as the late code is furnished thereto from the switching circuit 34. Further, the switching circuit 40 routes the early and late correlation signals to the summing circuit 44 so that the early signal is present at input 44a and the late signal at input 44b of the summing circuit 44. Thus, the signal at input 44a is effectively the output of all early correlation operating over two half-cycles, and the signal at input 44b is effectively the output of a late correlator.

The output of the "late" correlator is $x_1 + n_1$, and the output of the "early" correlator is $x_2 + n_2$. The cross-correlation between the two detector outputs is $$R_{12}(\lambda) = <[x_1(t) + n_1(t)][x_2(t + \lambda) + n_2(t + \lambda)]> \quad (1)$$

where the time correlation function is used, $$R_{xy}(\lambda) = <x(t)y(t + \lambda)> =$$

$$\lim_{T \to \infty} \frac{1}{2T} \int_{-T}^{T} x(t)y(t + \lambda)dt$$

because the process is assumed to be ergodic, that is the time average of the signal equals the statistical average. Expanding Equation (1) results in $$R_{12}(\lambda) = <x_1(t)x_2(t + \lambda)> + <n_1(t)n_2(t + \lambda)>$$
$$+ <x_1(t)n_2(t + \lambda)> + <x_2(t + \lambda)n_1(t)> =$$
$$R_{x_1x_2}(\lambda) + R_{n_1n_2}(\lambda) \quad (2)$$

where two terms were eliminated because the noise and signal are uncorrelated. Of the two remaining terms, the noise crosscorrelation term $R_{n_1n_2}(\lambda)$ will be analyzed hereinbelow to prove that $n_1$ and $n_2$ are uncorrelated. Substituting the proper functions for $n_1$ and $n_2$ gives $$R_{n_1n_2}(\lambda) = <[n(t)C(t + \tau - \frac{\Delta}{2})][n(t + \lambda)C(t + \tau + \lambda + \frac{\Delta}{2})]> \quad (3)$$
$$= <n(t)n(t + \lambda)> <C(t + \tau - \frac{\Delta}{2})C(t + \tau + \lambda + \frac{\Delta}{2})>$$

But the input noise process $n(t)$ is assumed to be white, so that $$<n(t)n(t + \lambda)> = R_n(\lambda) = \frac{N_0}{2} \delta(\lambda)$$

which is nonzero only for $\lambda = 0$. Therefore, $$R_{n_1n_2}(\lambda) = \begin{cases} 0, & \lambda \neq 0 \\ \frac{N_0}{2} <C(t + \tau - \frac{\Delta}{2})C(t + \tau + \frac{\Delta}{2})>, & \lambda = 0 \end{cases}$$

However, from the autocorrelation properties of the PN code, $$<C(t + \tau + \frac{\Delta}{2})C(t + \tau + \frac{\Delta}{2})> = \frac{-1}{L} \approx 0$$

when the code is long, which is the typical case. Thus $$R_{n_1n_2}(\lambda) \approx 0 \quad (4)$$

which shows that $n_1$ and $n_2$ are uncorrelated. Since they are Gaussian, as will be set forth, $n_1$ and $n_2$ are also statistically independent.

Since the detected noise outputs $n_{11}$ and $n_{12}$ are functions of the noise variable $n_1$; and, similarly $n_{21}$ and $n_{22}$ are functions of $n_2$, it can be concluded that $n_{11}$ is statistically independent of both $n_{21}$ and $n_{22}$, as is $n_{12}$. This result, based on the same argument used by Hartmann in the article previously referenced, is important to the following analysis.

Bandpass detector 36 has an input bandwidth $W_1$ (two-sided), an output bandwidth $B_1$ (one-sided), and a square-law device with a gain constant $k_1$ and a dc offset $v_1$. The output of the detector is comprised of a component near zero frequency and a noise component of bandwidth $B_1$ ($y_{11}$ and $n_{11}$, respectively for the late correlator). The "signal" output is $$y_{11} = k_1\eta_1(1 + \rho_{L1}) + v_1 \quad (5)$$

where $$\eta_1 = N_0 W_1$$

$$\rho_{L1} = \frac{A^2 R_c^2(\tau - \frac{\Delta}{2})}{2\eta_1}$$

and $$R_c(\tau - \frac{\Delta}{2}) \equiv \, <C(t)C(t + \tau - \frac{\Delta}{2})>$$

Figure 7:
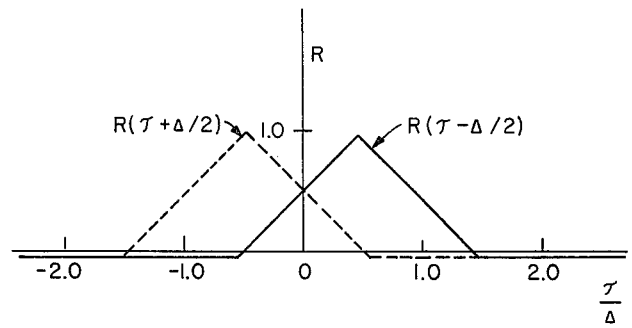
FIG. 7 shows the average voltage output from the two bandpass detectors as a function of the phase difference at the mixer.

The result is shown in FIG. 7 as a function of $\tau/\Delta$ and is based on the condition that the detector input bandwidth $W_1$ is small compared to the code rate $1/\Delta$, so that the signal input to the square law device is a sinewave of amplitude $$AR_c(\tau - \frac{\Delta}{2}),$$

i.e. the first mixer and bandpass filter form a correlator for the code. It is known in the art that the output of a square law detector with sine wave form and Gaussian noise input has a mean value given by Equation (5). Moreover, it is known that the variance of the square law detector output is $$k_1^2 \eta_1^2 (1 + \frac{P}{\eta_1}),$$

where $P$ is the signal power and the output bandwidth is equal to $W_1$. For the particular case under analysis, these results can easily be extended to give the variance of $n_{11}$ as $$Var(n_{11}) \equiv \sigma_{11}^2 = k_1^2 \eta_1^2 (\frac{2B_1}{W_1})(1 + 2\rho_{L1}) \qquad (6)$$

If $B_1$ is sufficiently smaller than $W_1$, e.g.

$$\frac{W_1}{2B_1} \geq 100,$$

$n_{11}$ is approximately Gaussian. Note that $n_{11}$ is zero-mean by definition. The dc component of the detector output due to detected noise is included by definition in $y_{11}$.

Results similar to Equations (5) and (6) for the four detectors, that is each of the two detectors 36 and 38 during two alternating half-cycles, are summarized as (7)

$$y_{11} = k_1 \eta_1 (1 + \rho_{L1}) + \nu_1 \qquad \sigma_{11}^2 = k_1^2 \eta_1^2 (\frac{2B_1}{W_1})(1 + 2\rho_{L1})$$

$$y_{12} = k_2 \eta_2 (1 + \rho_{L2}) + \nu_2 \qquad \sigma_{12}^2 = k_2^2 \eta_2^2 (\frac{2B_2}{W_2})(1 + 2\rho_{L2})$$

$$y_{21} = k_1 \eta_1 (1 + \rho_{E1}) + \nu_1 \qquad \sigma_{21}^2 = k_1^2 \eta_1^2 (\frac{2B_1}{W_1})(1 + 2\rho_{E2})$$

$$y_{22} = k_2 \eta_2 (1 + \rho_{E2}) + \nu_2 \qquad \sigma_{22}^2 = k_2^2 \eta_2^2 (\frac{2B_2}{W_2})(1 + 2\rho_{E2})$$

where $$\eta_1 = N_0 W_1 \quad \rho_{L1} = \frac{A^2 R_c^2(\tau - \frac{\Delta}{2})}{2\eta_1} \quad \rho_{E1} = \frac{A^2 R_c^2(\tau + \frac{\Delta}{2})}{2\eta_1}$$

-continued $$\eta_2 = N_0 W_2 \quad \rho_{L2} = \frac{A^2 R_c^2(\tau - \frac{\Delta}{2})}{2\eta_2} \quad \rho_{E2} = \frac{A^2 R_c^2(\tau + \frac{\Delta}{2})}{2\eta_2}$$

The output of the phase detector D is thus:

$$e_D(t,\tau) = d_1(t) [y_{11}(t,\tau) + n_{11}(t) - y_{22}(t,\tau) - n_{22}(t)] + d_2(t) [y_{12}(t,\tau) + n_{12}(t) - y_{21}(t,\tau) - n_{21}(t)] \qquad (8)$$

The time-averaged value of $e_D$ is the error voltage desired from the phase detector, which is denoted $D(\tau)$;

$$D(\tau) \equiv \, <e_d(t,\tau)> \, = \tfrac{1}{2}[y_{11}(t,\tau) + y_{12}(t,\tau) - y_{21}(t,\tau) - y_{22}(t,\tau)] \qquad (9)$$

Figure 8:
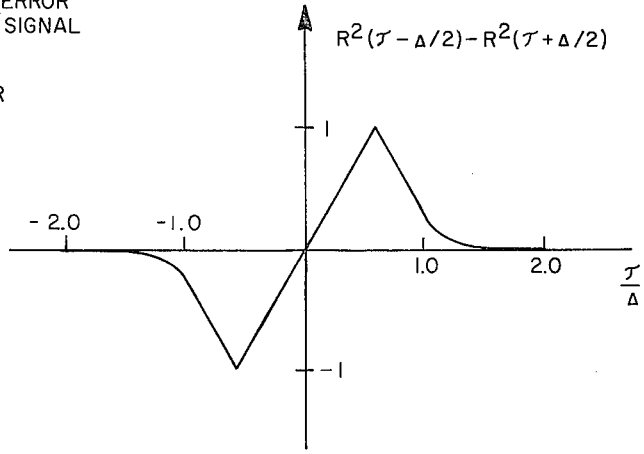
FIG. 8 shows the resulting phase error voltage as a function of phase error.

Substituting from (7) into (9) yields:

$$D(\tau) = \frac{A^2}{2}(\frac{k_1 + k_2}{2})[R_c^2(\tau - \frac{\Delta}{2}) - R_c^2(\tau + \frac{\Delta}{2})] \qquad (10)$$

which shows that the offset voltages are removed in the output. The term in brackets is the familiar delay detector function shown in FIG. 8. In particular, for small phase errors ($|\tau| < 0.5\Delta$), $$R_c^2(\tau - \frac{\Delta}{2}) - R_c^2(\tau + \frac{\Delta}{2}) = (0.5 + \frac{\tau}{\Delta})^2 - (0.5 - \frac{\tau}{\Delta})^2 \qquad (11)$$

$$= \frac{2\tau}{\Delta}$$

and $$D(\tau) = A^2 (\frac{k_1 + k_2}{2})(\frac{\tau}{\Delta}), \, |\frac{\tau}{\Delta}| < 0.5$$

The tracking performance of a loop is generally determined for small errors around the lock point, i.e., for small values of $\tau/\Delta$. In that case the loop can be described by a linear model in which the phase detector is represented by its gain at the point $\tau/\Delta = 0$, which is simply the slope of $D(\tau)$ near its origin. That slope is $$D'(\tau) = \frac{dD(\tau)}{d(\frac{\tau}{\Delta})} = A^2 (\frac{k_1 + k_2}{2}), \, |\frac{\tau}{\Delta}| < 0.5 \qquad (12)$$

For the special case of $k_1 = k_2 = k$, which is convenient for comparing noise effects, $$D(\tau) = kA^2 (\tau/\Delta) \qquad (13)$$

and $$D'(\tau) = kA^2 \qquad (14)$$

Equation (8) can be rewritten as $$e_D = d_1(y_{11} - y_{22}) + d_2(y_{12} - y_{21}) + d_1(n_{11} - n_{22}) + d_2(n_{12} - n_{21})$$

where time and delay arguments have been suppressed for convenience. Then the mean square of $e_D$ is $$<e_D^2> \, = \, <d_1^2> \, < (y_{11} - y_{22})^2> \, + \, <d_2^2> \, <(y_{12} - y_{21})^2> \, + \, <d_1^2> \, <n_{11}^2 - 2n_{11}n_{22} + n_{22}^2> \, + \, <d_2^2> \, <n_{12}^2 - 2n_{21}n_{12} + n_{21}^2> \, + \, <d_1^2> \, <(y_{11} - y_{22})(n_{11} - n_{22})> \, + \, <d_2^2> \, <(y_{12} - y_{21})(n_{12} - n_{21})> \, + \, <d_1 d_2> \, <\text{(other terms)}> \qquad (15)$$

From the definitions of $d_1(t)$ and $d_2(t)$, $$< d_1^2 > = < d_2^2 > = \tfrac{1}{2}$$

and $$< d_1 d_2 > = 0$$

Moreover, it has been shown that $$< n_{11} n_{22} > = < n_{21} n_{12} > = 0$$

and, since all $y_{ij}$ are constants and all $n_{mk}$ are zero-mean, $$< y_{ij} n_{mk} > = y_{ij} < n_{mk} > = 0, \text{ all } i, j, k, m$$

Substituting all of these equations into Equation (15) yields $$< e_D^2 > = \tfrac{1}{4}[(y_{22} - y_{11})^2 + (y_{21} - y_{12})^2] + \tfrac{1}{4}[\sigma_{11}^2 + \sigma_{12}^2 + \sigma_{21}^2 + \sigma_{22}^2] \quad (16)$$

From Equation (8), the square of the average value of $e_D$ is $$< e_d >^2 = \tfrac{1}{4}(y_{11} - y_{22})^2 + \tfrac{1}{4}(y_{12} - y_{21})^2 + \tfrac{1}{2}(y_{11} - y_{22})(y_{12} - y_{21}) \quad (17)$$

From Equations (16) and (17), the variance of the phase detector output is $$\text{Var}[e_D] = \tfrac{1}{4}[\sigma_{11}^2 + \sigma_{12}^2 + \sigma_{21}^2 + \sigma_{22}^2] + \tfrac{1}{4}(y_{11} - y_{22})^2 + \tfrac{1}{4}(y_{12} - y_{21})^2 - \tfrac{1}{2}(y_{11} - y_{22})(y_{12} - y_{21}) \quad (18)$$

Clearly, the variance of $e_D$ is a function of the difference in detector outputs due to imbalance and phase error. In oreder to complete a comparative analysis under balanced conditions, the following assumptions are made.

$$\tau = 0$$

$$k_1 = k_2 = k$$

$$W_1 = W_2 = W$$

$$B_1 = B_2 = B$$

$$V_1 = V_2 = 0$$

Under these conditions, $$y_{11} = y_{21} = y_{12} = y_{22}, \sigma_{11}^2 = \sigma_{21}^2 =$$
$$\sigma_{12}^2 = \sigma_{22}^2, \text{ and } R_c(\tau - \tfrac{\Delta}{2}) = R_c(\tau - \tfrac{\Delta}{2}) = 0.5.$$

Substituting these equations in Equation (18) yields $$\text{Var}(e_D) = 4k^2 N_0^2 WB \left[1 + \frac{a^2}{4N_0 W}\right] \quad (19)$$

The error variance can now be normalized with respect to the phase detector gain (slope) from Equation (14) to give $$\sigma_D^2 = \frac{\text{Var}(e_D)}{D'(\tau)^2} = \frac{1}{(\tfrac{S}{N})_0}\left[\tfrac{1}{2} + \frac{1}{(\tfrac{S}{N})_I}\right] \quad (20)$$

where $$(\tfrac{S}{N})_0 = \frac{A^2}{2N_0 B}$$

is the signal-to-noise ratio computed in the equivalent noise bandwidth (2B) of the lowpass filter, and $$(\tfrac{S}{N})_I = \frac{A^2}{2N_0 W}$$

is the signal-to-noise ratio computed in the bandpass filter bandwidth W.

In any of the detector configurations shown, the noise input is multiplied by the local code and then bandpass filtered. Since the local code is a pseudorandom binary sequence of unit amplitude, it can be satisfactorily modeled as a random variable with the following probabilities.

$$P(C = +1) = P(C = -1) = 0.5 \quad (21)$$

Figure 4:
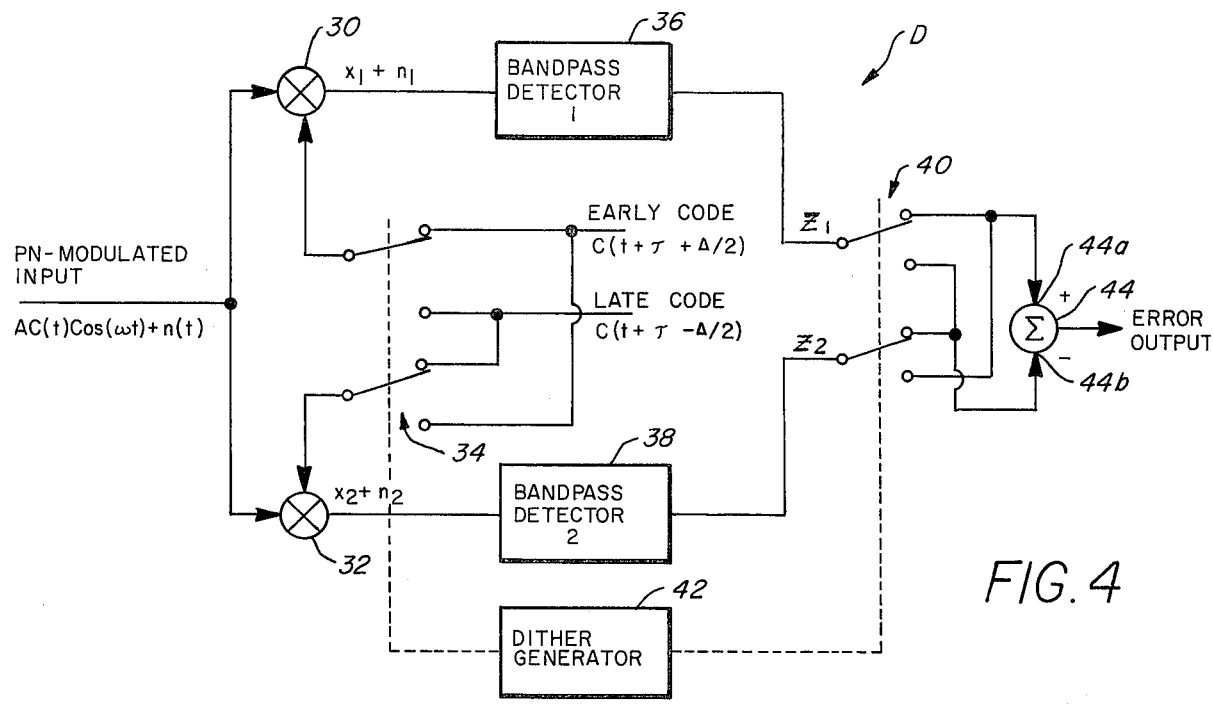
FIG. 4 is a schematic electrical circuit diagram of a phase detector according to the present invention.

The noise output of the mixer, $n_1$ in FIG. 4, can thus be described by $$P(n_1 \leq V) = P(n_1 \leq V) P(C = +1) + P(n_1 \geq -V) P(C = -1) \quad (22)$$

But the noise is Gaussian, and therefore has a symmetrical probabiity density function, so that $$P(n_1 \leq V) = P(n \geq -V) \quad (22)$$

Substituting Equations (21) and (22) into (23) yields $$P(n_1 \leq V) = P(n \leq V) \quad (24)$$

which indicates that the probability distribution of $n_1$ is the same as that of $n(t)$, which is Gaussian.

The whiteness of the noise at the mixer output can be demonstrated by means of the autocorrelation function. Since the noise input is assumed to be white, its autocorrelation function is $$R_n(\tau) = \frac{N_0}{2} \delta(\tau) \quad (25)$$

and that of the local code (of length L) is given by $$R_c(\tau) = \begin{cases} 1 - (\frac{L+1}{L})\frac{\tau}{\Delta}, & (jL - 1)\Delta < \tau < (jL + 1)\Delta \\ \frac{1}{L}, & \text{otherwise} \end{cases} \quad (26)$$

where $j$ is any integer. Since the noise and local code are statistically independent, the autocorrelation function of the product is just the product of $R_n(\tau)$ and $R_c(\tau)$. Thus $$R_{cxn}(\tau) = R_n(\tau) R_c(\tau) = \frac{N_0}{2} \delta(\tau) \approx R_n(\tau) \quad (27)$$

Therefore, the noise output of the mixer is white.

The foregoing disclosure and description of the invention are illustrative and explanatory thereof, and various changes in the size, shape, materials, components, circuit elements, wiring connections and contacts as well as in the details of the illustrated circuitry and construction may be made without departing from the spirit of the invention.

I claim:

1. A stabilized phase detector for a signal tracking loop to track an incoming signal in the presence of gain level changes and imbalance using two local reference signals, comprising:
- (a) mixer means for multiplying the incoming signal with the two local reference signals to form first and second product signals;
- (b) first bandpass detector means for forming an error signal from the first product signal for tracking the incoming signal;
- (c) second bandpass detector means for forming an error signal from the second product signal for tracking the incoming signal;
- (d) means for forming a composite error signal from the error signals from said first and second bandpass detector means; and
- (e) switching means comprising:
  - (1) first switching means for alternately interconnecting the two local reference signals to said mixer means; and
  - (2) second switching means for alternately interconnecting the error signals from said first and second bandpass detector means to said means for forming to thereby compensate for gain imbalance and level drift in said bandpass detector means.

2. The detector of claim 1, further including:
means for conducting the composite error signal to a voltage controlled oscillator to form a tracking signal.

3. The detector of claim 2, wherein the two local reference signals comprise a code signal having pulses occurring earlier in time than the tracking signal and a code signal having pulses occurring later in time than the tracking signal, and wherein:
said first switching means comprises means for alternately interconnecting the early code signal and late code signal to said mixer means.

4. The detector of claim 1, wherein said mixer means comprises:
- (a) first mixer multiplier means; and
- (b) second mixer multiplier means.

5. The detector of claim 4, further including:
means for conducting the composite error signal to a voltage controlled oscillator to form a tracking signal.

6. The detector of claim 5, wherein the two local reference signals comprise a code signal having pulses occurring earlier in time than the tracking signal and a code signal having pulses occurring later in time than the tracking signal, and wherein:
said first switching means comprises means for alternately interconnecting the early code signal and late code signal to said mixer means.

7. The structure of claim 6, wherein said first switching means operates in repeated operating half-cycles and comprises:
- (a) first electronic switch means for electrically connecting the early code signal to said first mixer multiplier means and said second mixer multiplier means during alternate operating half-cycles; and
- (b) second electronic switch means for electrically connecting the late code signal to said first mixer multiplier means and said second mixer multiplier means during alternate operating half-cycles opposite opposite the operating halfcycles of said first electronic switch means.

8. The detector of claim 1, wherein said means for forming a composite error signal comprises:
means for obtaining the difference in amplitude of the error signals from said first and second bandpass detector means.

9. The detector of claim 8, wherein said means for obtaining the difference in amplitude comprises:
summing means having a positive input terminal and a negative input terminal.

10. The detector of claim 9, wherein said second switch means operates in repeated operating half-cycles and comprises:
- (a) first electronic switch means for connecting the error signal from said first bandpass detector means to said positive input terminal and said negative input terminal during alternate operating half-cycles; and
- (b) second electronic switch means for connecting the error signal from said second bandpass detector means to said positive input terminal and said negative input terminal during alternate operating half-cycles opposite the operating half-cycles of said first electronic switch means.

11. The detector of claim 1, further including:
means for controlling the operation of said first and second switching means.

12. The detector of claim 11, wherein said means for controlling comprises:
means for operating said first and second switching means in synchronism with each other.

13. A method of phase detection with bandpass detector means to track an incoming signal in the presence of gain level changes and imbalance using two local reference signals, comprising the steps of:
- (a) multiplying the incoming signal with the two local reference signals in two mixers to form first and second product signals;
- (b) forming a first error signal from the first product signal for tracking the incoming signal;
- (c) forming a second error signal from the second product signal for tracking the incoming signal;
- (d) forming a composite error signal from the error signals by:
  - (1) alternately interconnecting the two local reference signals to the two mixers during said step of multiplying to thereby multiplex the two local reference signals in the first and second product signals; and
  - (2) alternately interconnecting the first and second error signals to thereby demultiplex same and thereby compensate for gain imbalance and level drift in said bandpass detector means.

14. The method of claim 13, further including the step of:
conducting the composite error signal to a voltage controlled oscillator to form a tracking signal.

15. The method of claim 14, wherein the two local reference signals comprise a code signal having pulses occurring earlier in time than the tracking signal and a code signal having pulses occurring later in time than the tracking signal, and wherein said step of alternately interconnecting comprises:
alternately interconnecting the early code signal and late code signal to the two mixers.

16. The method of claim 15, wherein said step of alternately interconnecting is performed in repeated operating half-cycles and comprises:
- (a) electrically connecting the early code signal to the two mixers during alternate operating halfcycles; and
- (b) electrically connecting the late code signal to the two mixers during opposite operating half-cycles.

17. The method of claim 13, wherein said step of forming a composite error signal further includes:
obtaining the difference in amplitude of the first and second error signals.

* * * * *